US012743275B1

(12) United States Patent
Goldsmith et al.

(10) Patent No.: US 12,743,275 B1
(45) Date of Patent: Sep. 22, 2026

(54) AUTOMATICALLY GENERATING MODELS FOR DATA FLOW ANALYSIS USING MACHINE LEARNING

(71) Applicant: Black Duck Software, Inc., Sunnyvale, CA (US)

(72) Inventors: Simon Goldsmith, Oakland, CA (US); David Autrey Bohannon, Sugar Hill, GA (US); Zunaira Zaman, Belfast (GB); Zhi Zhang, San Francisco, CA (US); Songtao Xia, Lynnwood, WA (US); Aleksandar Zeljic, San Francisco, CA (US); Tushar Sharma, San Carlos, CA (US)

(73) Assignee: Black Duck Software, Inc., Sunnyvale, CA (US)

( * ) Notice: Subject to any disclaimer, the term of this patent is extended or adjusted under 35 U.S.C. 154(b) by 253 days.

(21) Appl. No.: 18/583,850

(22) Filed: Feb. 21, 2024

(51) Int. Cl.
*G06F 8/72* (2018.01)
*G06F 16/31* (2019.01)

(52) U.S. Cl.
CPC .............. *G06F 8/72* (2013.01); *G06F 16/322* (2019.01)

(58) Field of Classification Search
CPC ................................ G06F 8/72; G06F 16/322
USPC ........................................................ 717/120
See application file for complete search history.

(56) References Cited

U.S. PATENT DOCUMENTS 10,135,856 B2 * 11/2018 Tripp .................. H04L 63/1433
2015/0309813 A1 * 10/2015 Patel ................... G06F 11/3698 703/22
2018/0144127 A1 * 5/2018 Duer ....................... G06F 21/52
2020/0320202 A1 * 10/2020 Farkash .............. G06F 21/6245
2023/0177170 A1 * 6/2023 Olson ...................... G06N 5/01 726/25
2023/0266949 A1 * 8/2023 Kurmi ....................... G06F 8/72 717/115
2023/0305813 A1 * 9/2023 Jalal .......................... G06F 8/10
2025/0131032 A1 * 4/2025 Platais ............... G06F 11/0793

OTHER PUBLICATIONS

Zaharia, Matei, et al. "Accelerating the machine learning lifecycle with MLflow." IEEE Data Eng. Bull. 41.4 (2018): pp. 39-45. (Year: 2018).*

Kronjee, Jorrit, Arjen Hommersom, and Harald Vranken. "Discovering software vulnerabilities using data-flow analysis and machine learning." Proceedings of the 13th international conference on availability, reliability and security. 2018. pp. 1-10. (Year: 2018).*

(Continued)

*Primary Examiner* — Satish Rampuria

(57) ABSTRACT

In one example, a non-transitory computer readable medium includes stored instructions which, when executed by a processor, cause the processor to acquire a set of function stubs of a software program, acquire source code for a set of functions corresponding to the set of function stubs and library documentation related to the set of functions, execute a machine learning model that takes the source code, the library documentation, and a set of queries as inputs and generates as an output a set of answers to the set of queries, and construct a function model of a function of the set of functions, using the set of answers.

20 Claims, 4 Drawing Sheets

(56) References Cited

OTHER PUBLICATIONS

Santiago, Dionny, et al. "Abstract flow learning for web application test generation." Proceedings of the 9th ACM SIGSOFT International Workshop on Automating TEST Case Design, Selection, and Evaluation. 2018. pp. 49-55. (Year: 2018).*
Korel, Bogdan. "Automated software test data generation." IEEE Transactions on software engineering 16.8 (1990): pp. 870-879. (Year: 1990).*
Cheung, Melissa, et al. "Current trends in flow cytometry automated data analysis software." Cytometry Part A 99.10 (2021): pp. 1007-1021. (Year: 2021).*
Dubey, Harsh Kumar, et al. "Automated data flow testing." 2012 Students Conference on Engineering and Systems. IEEE, 2012. pp. 1-5. (Year: 2012).*

* cited by examiner

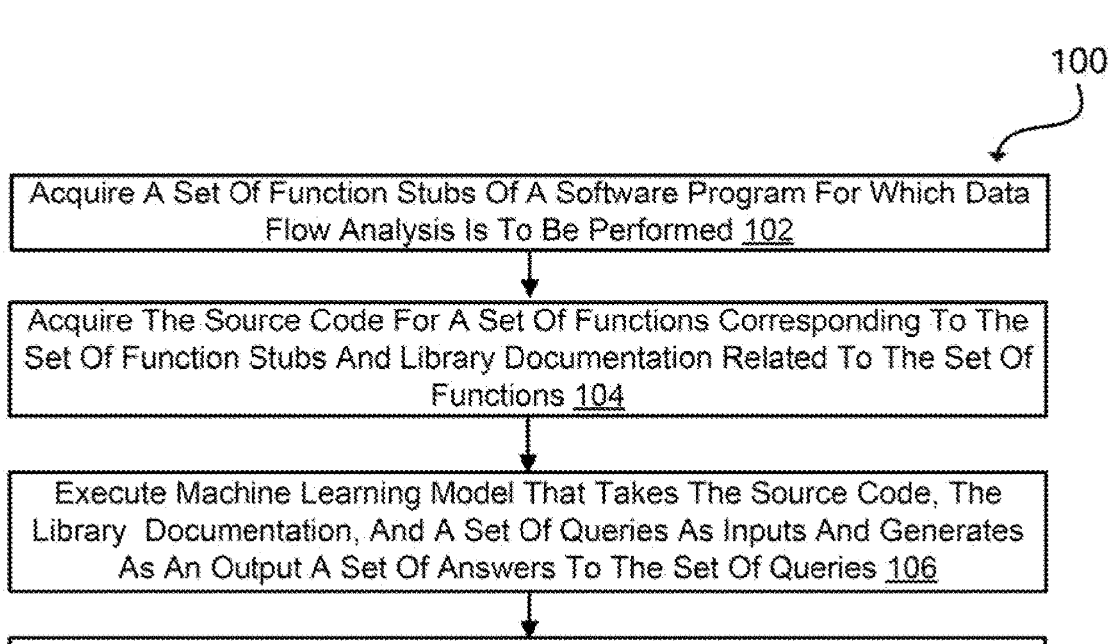

```
<?php>

namespace Doctrine\ORM;

/**
 * A Query object represents a DQL query.
 */
final class Query extends \Doctrine\ORM\AbstractQuery
{
    /**
     * Gets the SQL query/queries that correspond to this DQL query.
     *
     * @return list<string>/string The built SQL query or an array of all SQL queries.
     */
    public function getSQL( ) { }
    /**
     * Returns the corresponding AST for this DQL query.
     *
     * @return SelectStatement/UpdateStatement/DeleteStatement
     */
    public function getAST( ) { }
    . . .
```

```
{
    "sensitive_data_source": {
        "arguments": [
        {
            "name": "$length",
            "type": "int",
            "label": "None",
            "justification": "The argument is an integer representing the length of the random string
to be generated. It does not represent any sensitive data."
        }
    ],
    "return_value": {
        "type": "string",
        "label": "SecureRandom",
        "justification": "The function returns a randomly generated string, which can be used as a
cryptographic key or other security-related entities.",
        "name": "retval"
    }
  },
  "server_source": {
  . . .
  }
. . .
```

```
// retval: The function returns a randomly generated string, which can be used as a cryptographic
key or other security-related entities.
public static function string(int $legth) : string {
    $retval = unspecified( );
    sensitive_data_source(in: $retval, sensitive_data_source_kind: "SecureRandom");
    return $retval;
}
```

FIG. 4

AUTOMATICALLY GENERATING MODELS FOR DATA FLOW ANALYSIS USING MACHINE LEARNING

TECHNICAL FIELD

The present disclosure relates generally to software application analysis and relates more particularly to automatically generating models for data flow analysis using machine learning.

BACKGROUND

Data flow analysis is a form of static application security testing (SAST) in which the flow of data through a software application is traced through the application source code to identify potential security or quality issues in the application. Data flow analysis identifies sources where data enters the application, sinks where data is stored, processed, or transmitted by the application, and sanitizers that render data safe for a specific context.

Data flow analysis utilizes function models, which represent the possible behaviors of source code functions (e.g., function arguments, return values, and the like) from the point of view of a caller. Such function models provide a mapping of source code elements based on a language and libraries used by an application. The function models are provided to a data flow engine to help the data flow engine trace the flow of data through the application source code and identify vulnerabilities.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 illustrates a flow diagram of an example method for automatically generating models for data flow analysis using machine learning.

FIG. 2 illustrates an example PHP: Hypertext Preprocessor stub file from which a set of function stubs may be generated.

FIG. 3 illustrates a portion of a JavaScript Object Notation representation for an example PHP: Hypertext Preprocessor function.

FIG. 4 illustrates an example function model that may be constructed from the intermediate representation of FIG. 3.

DETAILED DESCRIPTION

Figure 5:
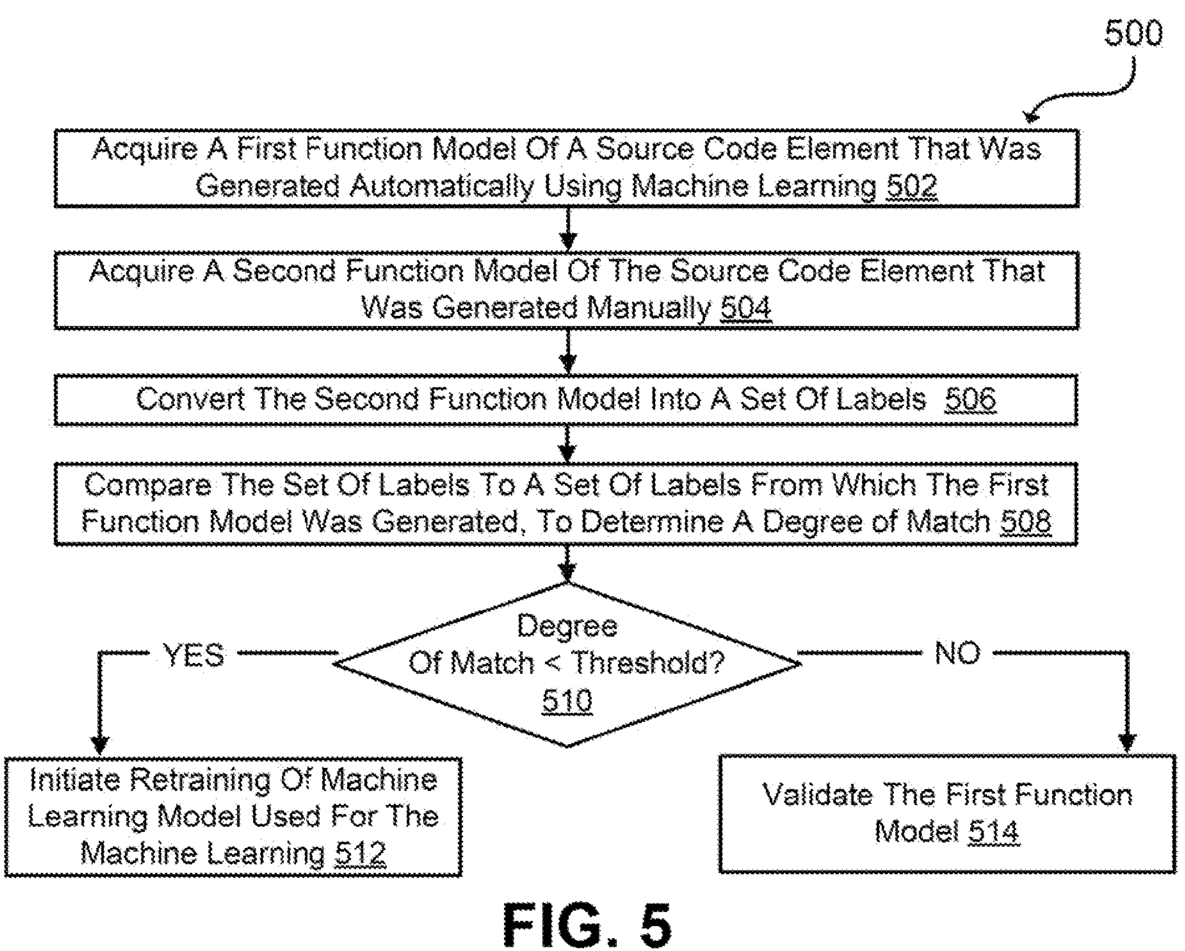
FIG. 5 illustrates a flow diagram of an example method for validating machine learning-generated models that are built for data flow analysis.

Aspects of the present disclosure relate to automatically generating models for data flow analysis using machine learning. As discussed above, data flow analysis utilizes function models, which represent the possible behaviors of source code functions (e.g., function arguments, return values, and the like) from the point of view of a caller. Such function models provide a mapping of source code elements based on a language and libraries used by an application. The function models are provided to a data flow engine to help the data flow engine trace the flow of data through the application source code and identify vulnerabilities.

Third-party library code is utilized often in source code. In order for data flow analysis to effectively identify vulnerabilities in source code that utilizes third-party library code, the data flow analysis needs to understand the purpose of the library code in the context of the source code, as well as the security context of the library code (e.g., whether the function embodied in the library code uses a string that is passed to the function in a way that makes the string vulnerable to an attack such as a structured query language injection attack). Often, a human software developer must manually examine the source code to determine the purpose and security context of the library code. This manual process does not scale well, particularly for situations in which the source code relies on new libraries, programming languages, or frameworks.

Examples of the present disclosure automate the generation of function models for data flow analysis using machine learning techniques. In one particular example, program-specific information about a software application, such as the software application's source code and documentation related to the source code, can be provided to a query model that generates a set of targeted, case-specific queries. The queries may take the form of a decision tree and may be specifically tailored to determine whether any functions (e.g., data sources, data sinks, data pass through, or the like) of the software application have properties that may be relevant for data flow analysis (e.g., data sources, data sinks, data pass through, or the like). These targeted, case-specific queries may in turn be provided as input to a language generation model, along with the source code and documentation. The responsive outputs of the machine learning model may be used to construct a function model that represents a function of the software application. The function model describes the function in a machine-readable manner that helps a data flow engine to understand the purpose and security context of the function in the source code.

Technical advantages of the present disclosure include, but are not limited to, more efficient detection of vulnerabilities and quality issues in software applications by providing a mechanism by which effective function models for source code elements of the software applications can be automatically generated. Automatic generation of the function models speeds the generation of the function models, which allows any subsequent data flow analysis of the software applications that relies on the function models to be performed sooner and therefore to detect potential vulnerabilities and quality issues earlier. The effectiveness of the automatically generated function models may be periodically evaluated, and the generation process adjusted if the properties of the automatically generated function models deviate from the properties of manually generated function models for the same source code elements by more than a threshold.

Further technical advantages of the present disclosure include improving the functioning of a computer by enabling more efficient detection of vulnerabilities and quality issues in software applications. If left undetected, such vulnerabilities and quality issues could expose the computer to security breaches and/or other malfunctions.

FIG. 1 illustrates a flow diagram of an example method 100 for automatically generating models for data flow analysis using machine learning. In one example, the method 100 may be performed by one or more components of an application server or a computer system, such as the computer system 600 illustrated in FIG. 6. For the sake of example, the method 100 is described as being performed by a processing system.

At 102, the processing system acquires a set of function stubs of a software program for which data flow analysis is to be performed. In one example, the data flow analysis may be a taint flow analysis. In this case, the processing system would need to identify function-level attributes of the software program, such as taint sources, taint sinks, and passthrough types. The processing system would then acquire the function stubs for the functions of taint sources, taint sinks, and passthrough types. A function stub (also referred to as function signature), in this context, is a program that stands in as a place holder for a real program or function in the source code.

In one example, the set of function stubs may be downloaded or generated using a set of stub files of the software program. A stub file is a class definition in which individual function bodies are removed, leaving only the function stubs.

FIG. 2, for instance, illustrates an example PHP: Hypertext Preprocessor (PHP) stub file 200 from which a set of function stubs may be generated. In the example stub file 200, the function stubs include getSQL( ) { } and getAST( ) { }.

Referring back to FIG. 1, at 104, the processing system acquires the source code for a set of functions corresponding to the set of function stubs and library documentation related to the set of functions. In one example, each function in the set of functions may correspond to one function stub in the set of function stubs. As discussed above, for data flow analysis, the set of functions may include functions such as a source function where data enters the application, a sink function where data is stored, processed, or transmitted by the application, and a sanitizer function that renders data safe for a specific context. In one example, the source code for the set of functions may be downloaded from a public or private repository, or uploaded by a user.

In one example, the library documentation includes data (e.g., images and/or text) generated by the developers of the software program to document their code writing process and to what the code does and how the code may be used. For instance, library documentation may include explanations of code functions and code blocks, developer handbooks, summaries of various aspects of the software program, images or diagrams showing sequence and entity relationships, application programming interface (API) documentation, and/or other data. The library documentation may be downloaded from a repository or from a documentation website. Alternatively, the library documentation may be dynamically generated from docblock comments (a comment specified in source code to document a code segment) in the source code or from information on a library documentation website.

In one example, 104 may include saving each function stub of the set of function stubs to a dictionary database. The dictionary entry for each function stub may include the source code data and library documentation for the function corresponding to the function stub.

At 106, the processing system executes a machine learning model that takes the source code, the library documentation, and a set of queries as inputs and generates as an output a set of answers to the set of queries. In one example, the machine learning model is a generative artificial intelligence (AI) model, such as a large language model (LLM). For instance, the LLM may be a Generative Pre-trained Transformer (GPT)-4 model. The LLM uses a deep learning neural network that may be trained on text and/or image data to predict text. In one example, the machine learning model is trained offsite. However, it should be noted that the method 100 is algorithm-agnostic. For instance, another machine learning algorithm that is capable of breadth-first and depth-first searching could be deployed at 106. In one example, the set of queries may be captured in a template that is populated with the source code and library documentation associated with each function stub in the set of function stubs. In a further example, the template may arrange the set of queries as a decision tree, where the decision tree includes a series of decision nodes, and each decision node of the series of decision nodes corresponds to at least one query of the set of queries. In one example, the set of queries may include a query that inquires whether a function of the set of functions is at least one of: a credentials sink, an operating system command sink, a parser risk sink, an injection sink, a data leak sink, an unencrypted data source, a server source, or a sensitive data source.

For instance, an example decision tree for generating InjectionContext labels might be structured as shown below:

When analyzing function documentation, only consider the Description,
Parameters/Arguments, and Return Values. Ignore any examples.
The term argument is synonymous with the term parameter.
Here is the function signature: {signature}
Here is the function documentation: {documentation}
Given the above information about this function, examine the arguments of the function and proceed through the decision nodes:

1. General:
   Is this function a constructor?
   Label: None
   Is the function performing escaping, sanitization, or encoding?
   Label: None
   Is the argument of type int, boolean, or double?
   Label: None
2. Database Interactions:
   Is the argument used to form a database query name?
   Label: DatabaseQueryName
   Is the argument used in SQL statements or SQL database interactions?
   Label: Sql
   Is the argument used in a NoSQL database query?
   Label: NoSQL
3. Web-Based Data Handling:
   Is the argument used to create an HttpHeader name (ignore HTTP header values as those are normally sanitized by default)?
   Label: HttpHeader
   Is the argument used to create an HTTP redirect?
   Label: HttpRedirect
   Is the argument returned in an HTTP response body without validation or sanitization?
   Label: HttpResponse
   Is the argument used to create a Url or Url query string?
   Label: Url
   Is the argument used to create a session identifier?
   Label: SessionIdentifier
4. Deserialization & Parsing:
   Is the argument deserialized without proper validation or safety checks?
   Label: Deserialization Is the argument used in Java-specific data operations?
Label: Java
Is the argument used in JSP path inclusions or JSP-specific SQL operations?
Label: JspIncludePath & JspSQL
Is the argument used to dynamically create regular expression patterns?
Label: Regex
5. Path-based Injection Sink:
Is the argument related to cookies paths, HTTP requests paths, URL paths, and file handles?
Label: None
Is the argument used to create relative or absolute filesystem paths for operations such as copy, delete, read, write, etc.?
Label: Path
6. Script & Code Execution
Is the argument type 'callable', or is it used in a callback, script, or code snippet, and does not undergo proper sanitization or validation?
Label: Script
Is the argument converted into an object using reflection without proper validation or safety checks?
Label: Reflection
Is the argument used in an XPath query without proper sanitization or validation?
Label: XPath
7. Others
Is the argument used in an LDAP query without proper sanitization or validation?
Label: Ldap
Is the argument used in a Java Content Repository (JCR) query?
Label: Jcr
Is the argument used in a JNI operations?
Label: Jni
Is the argument used in an OGNL expression?
Label: Ognl
Is the argument used in a SpringEL expression?
Label: SpringEL
Is the argument used in a SymfonyEL expression?
Label: SymfonyEL
Is the argument passed across trust boundaries?
Label: TrustBoundary
Is the argument used to dispatch views by name?
Label: ViewDispatchName
8. None
If none of the aforementioned criteria are satisfied:
Conclusively label the injection_context as "None".
Based on the above decision tree analysis, determine the injection_context label for the provided function arguments.
Structured Analysis:
Document your findings in this structured JSON format—do not return any free form text:
{{
"injection_sink":{sink_structure}
}}

At each decision node, the source code and library documentation associated with each function stub may be utilized by the machine learning model to determine a response to the query embodied in the decision node. Each decision node may pose a query related to a function's handling of data, such as whether the function handles data that is designated as sensitive, handles data that comes from a database or from a file system, or the like.

In one example, an affirmative response to a decision node query may be associated with a label, while a negative response to the decision node query may be associated without a label, i.e., with no label. Thus, if the machine learning model determines that the response to the decision node query is affirmative (e.g., yes, the function handles sensitive data), the machine learning model may assign the label associated with the decision node query to the function. As such, in one example, the set of answers that is output by the machine learning model may include a set of labels, where each label in the set of labels corresponds to one query of the set of queries (e.g., one decision node of the template/decision tree) for which the answer or decision was affirmative.

In a further example, a label that is assigned to a query may capture the context for the associated function (e.g., source, sink, passthrough, etc.), where this context is analyzed by the processing system in order to identify vulnerabilities in the software program. For instance, a label of "SQL" may indicate that the associated function is an SQL injection sink (as opposed to simply an injection sink, for instance).

In one example, the processing system may evaluate each function stub in the set of function stubs one-by-one. Evaluation of each function stub may involve traversing the decision tree, as described above, and collecting the labels that are satisfied by the function stub.

At 108, the processing system constructs a function model of a function of the set of functions, using the set of answers. In one example, constructing the function model may involve first compiling the set of answers (e.g., the set of labels) into an intermediate structure, and then converting the intermediate structure into the function model.

In one example, the intermediate structure is a JavaScript Object Notation (JSON) structure. In this case, the JSON structure captures multiple data points. These data points may include, but are not limited to, one or more of: source and sink labels for arguments and return values of the source code, passthrough labels for arguments, and the machine learning model's justifications for each label. In one example, each query input to the machine learning model has a one-to-one correspondence with an object in the intermediate structure.

FIG. 3, for instance, illustrates a portion of a JavaScript Object Notation representation 300 for an example PHP: Hypertext Preprocessor function. In particular, the example PHP function represented by the portion of the JSON representation 300 is the PHP Random.string( ) function. It is noted that the use of PHP in FIG. 3 is an example only; the method 100 is language-agnostic. The JSON representation 300 models the return value of the example function as a source of sensitive data (labeled "SecureRandom").

Once the intermediate structure has been constructed from the set of answers, the processing system may convert the intermediate structure into a function model. In one example, converting the intermediate structure into a function model may involve iterating over the intermediate structure to identify the labels assigned to attributes of the function, and then converting the labels assigned to the attributes into a code representation that is readable by a data flow engine.

For instance, a given intermediate structure may include effects (e.g., server_source, injection_sink, credentials_sink, or the like) and labels (e.g., more granular contexts for the effects, such as SQL, password, or the like) assigned to the arguments and return values of the function corresponding to the intermediate structure. To convert these effects and labels into a code representation, the processing system may iterate over all of the data in the intermediate structure and map the data to the code representation expected by the data flow engine (e.g., using template strings).

An example intermediate structure is shown below:

```
"credentials_sink": {
"arguments": [{
"name": "$password", "type": "string", "label": "Password", "justification": " . . . "}
]
```

For this example intermediate structure, the effect is "credentials_sink." A specific function call is used to implement a credentials_sink model element in the software development kit (SDK). Furthermore, it can be seen that the credentials_sink effect applies to an argument with the name "$password," and that the label assigned to the effect by the machine learning model is "Password." Thus, using the following IF blocks and template strings:

```
if effect==Effects_ID.server_source:
    code+='\tserver_source(in: ${ }, server_source_kind: "{ }");\n'.format(name, label)
    elif effect==Effects_ID.sensitive_data_source:
    code+='\tsensitive_data_source(in: $ { }, sensitive_data_source_kind: "{ }");\n'.format(name, label)
    elif effect==Effects_ID.data_leak_sink:
    code+='\tdata_leak_sink(in: ${ }, data_leak_kind: "{ }");\n'.format(name, label)
    elif effect==Effects_ID.credentials_sink:
    code+='\tcredentials_sink(in: ${ }, credentials_kind: "{ }");\n'.format(name, label)
    elif effect==Effects_ID.injection_sink:
    code+='\tinjection_sink(in: ${ }, injection_context: "{ }");\n'.format(name, label)
    elif effect==Effects_ID.unencrypted_data_source:
    code+='\tunencrypted_data_source(in: ${ }, unencrypted_data_source_kind: "{ }");\n'.format(name, label)
    elif effect==Effects_ID.os_command_sink:
    code+='\tos_command_sink(in: ${ }, os_command_part: "{ }");\n'.format(name, label)
    elif effect==Effects_ID.parser_risk_sink:
    code+='\tparser_risk_sink(in: ${ }, parser_risk_sink: "{ }");\n'.format(name, label)
```

produces the following line of code:

```
credentials_sink (in: $password, credentials_kind: "Password")
```

Since the function name or signature is already known, the new model code can be implemented in the body, which produces the modeled function definition that is to be consumed by the data flow engine:

```
function foo($password) {
    credentials_sink(in: $password, credentials_kind: "Password")
}
```

It should be noted that the resultant code representation will look different depending upon the data flow engine that is being used for the data flow analysis. For instance, some data flow engines utilize function definition style, while other data flow engines utilize different styles.

FIG. 4, for instance, illustrates an example function model 400 that may be constructed from the intermediate representation 300 of FIG. 3.

At 110, the processing system provides the function model as an input to a data flow engine for use in performing data flow analysis for the software program. As discussed above, the data flow analysis involves utilizing the function model, as well as function models for other functions of the software program, to trace the flow of data through the application source code and identify vulnerabilities. The data flow analysis at 110 may be performed in accordance with any known method for data flow analysis that relies on function models.

In one example, prior to 110, a human subject matter expert may review the function model for correctness. Review by the human subject matter expert may involve, for instance, code review, benchmark analysis, or other techniques. In one example, the human subject matter may make one or more modifications to the function model before the function model is finalized for use in data flow analysis.

FIG. 5 illustrates a flow diagram of an example method 500 for validating machine learning-generated models that are built for data flow analysis. In one example, the method 500 may be performed by one or more components of an application server or a computer system, such as the computer system 600 illustrated in FIG. 6. For the sake of example, the method 500 is described as being performed by a processing system.

At 502, the processing system acquires a first function model of a source code element that was automatically generated using machine learning. As discussed above, the source code element may represent a function of a software application, where the function may be a source where data enters the application, a sink where data is stored, processed, or transmitted by the application, or a sanitizer that renders data safe for a specific context. The first function model may represent the source code element in a code form that is readable by a data flow engine.

As also discussed above, the machine learning model that was used to generate the first function model may be an LLM that takes the source code, the library documentation, and a set of queries as inputs and generates as an output a set of answers to the set of queries, where the set of answers is utilized to construct the first function model.

At 504, the processing system acquires a second function model of the source code element that was generated manually. For instance, the second function model may be generated by a user (e.g., a human subject matter expert). Like the first function model, the second function model may represent the source code element in a code form that is readable by a data flow engine.

At 506, the processing system converts the second function model into a set of labels.

In one example, each label in the set of labels may represent an instance in which the source code element handles data that is considered to be sensitive (e.g., data that is identified as requiring protection). For instance, each label may represent an instance in which a decision node of a decision tree would be answered in the affirmative for the source code element, where the decision node poses a query related to a corresponding source code element's handling of data, such as whether the source code element handles sensitive data, handles data that comes from a database or from a file system, or the like.

In one example, prewritten application code may map the possible labels that may be assigned to functions of the software program to function models. This prewritten application code may allow the processing system to translate between labels and corresponding function models. Thus, for instance, referring to FIG. 4 as an example, the body of the function model 400 may be parsed, and the call to "sensitive_data_source( )" may be detected with the arguments "$retval" and "SecureRandom," which a prewritten application code may translate back into "sensitive_data_source": {, "return_value":{, and "label": "SecureRandom."

At 508, the processing system compares the set of labels to another set of labels from which the first function model was generated, to determine a degree of match. For instance, the first function model may have been generated in a manner similar to the method 100 discussed above in connection with FIG. 1. If the first function model is generated in this manner, then a set of labels will have been generated for the source code element in the process of generating the first function model.

In one example, the degree of match may be quantified using an algorithm that measures a distance (e.g., a Hamming distance, a Euclidean distance, a Manhattan distance, a Minkowski distance, or the like) between first function model and the second function model based on the respective sets of labels.

At 510, the processing system determines whether the degree of match is less than a threshold. In one example, the threshold may be a predefined, user-configurable threshold that is used to determine how closely an automatically generated function model matches a human-generated function model for the same source code element. Thus, a degree of match that is below that threshold would indicate that the second function model is not similar enough to the first function model to produce a result of similar quality when provided to a data flow engine for data flow analysis. However, if the degree of match is not less than the threshold (i.e., is greater than or equal to the threshold), then this would indicate that the second function model is similar enough to the first function model to produce a result of similar quality when provided to a data flow engine for data flow analysis.

If the processing system concludes at 510 that the degree of match is less than the threshold, then the method 500 proceeds to 512. At 512, the processing system initiates retraining of the machine learning model used for the machine learning.

For instance, if the second function model is not similar enough to the first function model to produce a result of similar quality when provided to a data flow engine for data flow analysis, then this may indicate a need to adjust the way in which function models are automatically generated using the machine learning. In one example, providing additional, potentially better quality, training data to the machine learning model may help the machine learning model to learn to produce better quality function models that are closer to the function models that a human subject matter expert would be expected to generate.

If the processing system concludes at 510 that the degree of match is not less than the threshold, then the method 500 proceeds to 514. At 514, the processing system validates the first function model. Validation may indicate that the machine learning model (and, more specifically, the queries applied by the machine learning model to the source code and documentation) is producing results (in the form of function models) of a desired quality. As such, no further action may be needed.

Thus, according to one example of the present disclosure, a non-transitory computer readable medium includes stored instructions which, when executed by a processor, cause the processor to acquire a set of function stubs of a software program, acquire source code for a set of functions corresponding to the set of function stubs and library documentation related to the set of functions, execute a machine learning model that takes the source code, the library documentation, and a set of queries as inputs and generates as an output a set of answers to the set of queries, and construct a function model of a function of the set of functions, using the set of answers.

In another example of the present disclosure, a method includes acquiring a set of function stubs of a software program, acquiring source code for a set of functions corresponding to the set of function stubs and library documentation related to the set of functions, executing a machine learning model that takes the source code, the library documentation, and a set of queries as inputs and generates as an output a set of answers to the set of queries, and constructing a function model of a function of the set of functions, using the set of answers.

In another example of the present disclosure, a non-transitory computer readable medium includes stored instructions which, when executed by a processor, cause the processor to acquire a first function model of a source code element that was automatically generated using machine learning, acquire a second function model of the source code element, convert the second function model into a set of labels, compare the set of labels to another set of labels from which the first function model was generated, to determine a degree of match, and initiate retraining of a machine learning model used for the machine learning when the degree of match is less than a threshold.

Figure 6:
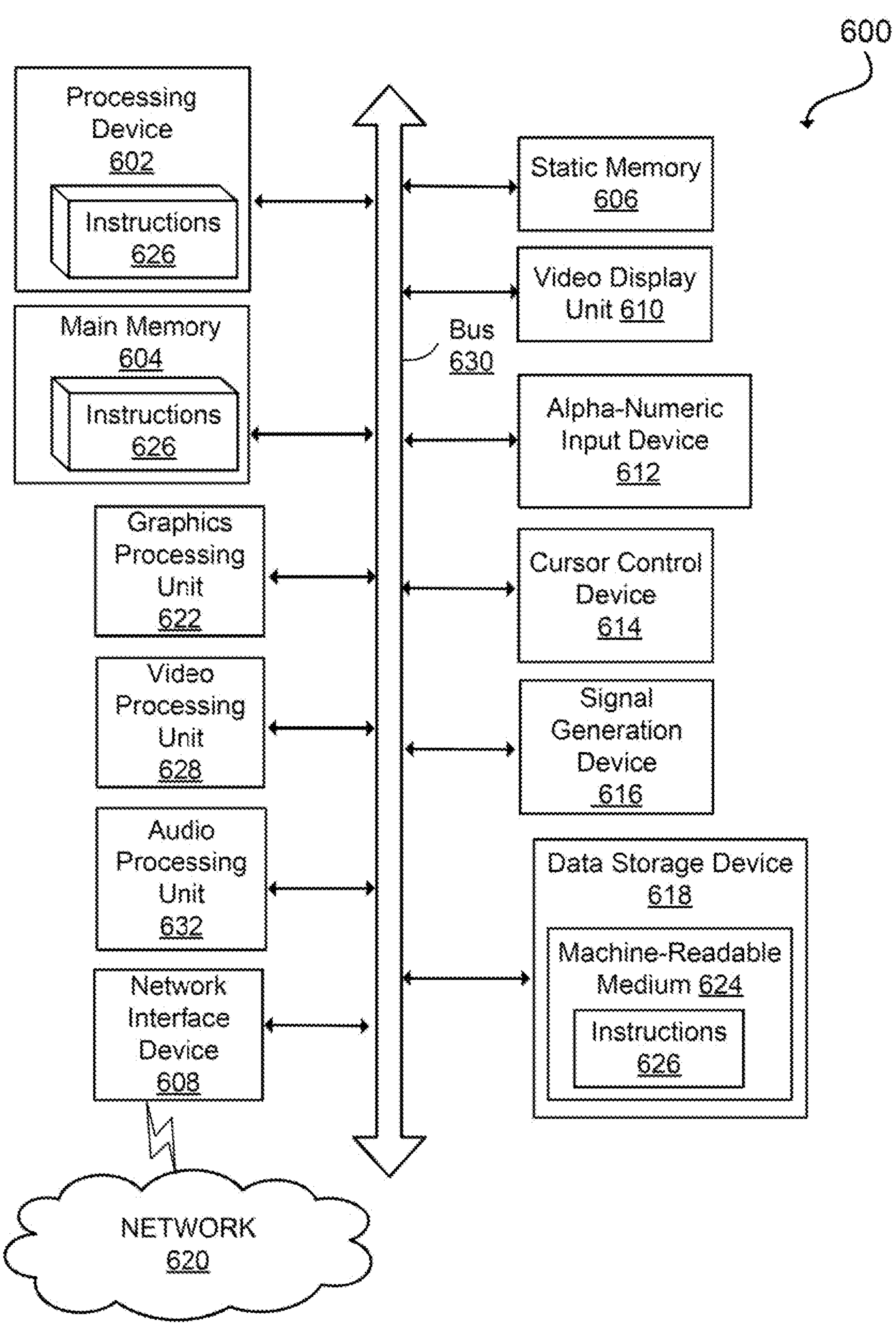
FIG. 6 illustrates a diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A non-transitory computer readable medium comprising stored instructions which, when executed by a processor, cause the processor to:

acquire a set of function stubs of a software program;

acquire source code for a set of functions corresponding to the set of function stubs and library documentation related to the set of functions;

execute a query model that generates a set of queries, wherein the query model bases the set of queries on the source code and the library documentation so that the set of queries is tailored to a context of the software program;

execute a machine learning model that takes the source code, the library documentation, and the set of queries as inputs and generates as an output a set of answers to the set of queries;

construct a function model of a function of the set of functions, using the set of answers; and execute a data flow analysis of the software program, wherein the data flow analysis uses the function model to trace a flow of test data through the source code, and wherein the function model describes a purpose of the function within the context of the software program in a manner that is understandable by a data flow engine that performs the data flow analysis.

2. The non-transitory computer readable medium of claim 1, wherein the function comprises at least one of: a source function where data enters the software program, a first sink function where the data is stored by the software program, a second sink function where the data is processed by the software program, a third sink function where the data is transmitted by the software program, or a sanitizing function that renders the data safe for a specific context of the software program.

3. The non-transitory computer readable medium of claim 1, wherein the machine learning model comprises a large language model.

4. The non-transitory computer readable medium of claim 1, wherein the set of queries is captured in a template that is populated with the source code and the library documentation.

5. The non-transitory computer readable medium of claim 4, wherein the set of queries includes a query that inquires whether the function is at least one of: a credentials sink, an operating system command sink, a parser risk sink, an injection sink, a data leak sink, an unencrypted data source, a server source, or a sensitive data source.

6. The non-transitory computer readable medium of claim 4, wherein the template arranges the set of queries as a decision tree, and wherein the decision tree includes a series of decision nodes, and each decision node of the series of decision nodes corresponds to at least one query of the set of queries.

7. The non-transitory computer readable medium of claim 6, wherein each decision node of the series of decision nodes is associated with a label, and wherein the machine learning model assigns the label to the function when an answer to the at least one query is affirmative for the function.

8. The non-transitory computer readable medium of claim 7, wherein the set of answers comprises at least one label associated with at least one decision node of the series of decision nodes.

9. The non-transitory computer readable medium of claim 1, wherein the function model is constructed by:

compiling the set of answers into an intermediate structure; and converting the intermediate structure into the function model.

10. The non-transitory computer readable medium of claim 9, wherein the intermediate structure is a JavaScript object notation structure.

11. The non-transitory computer readable medium of claim 1, wherein the function model comprises a code representation of the function that is readable by the data flow engine.

12. The non-transitory computer readable medium of claim 11, wherein the instructions further cause the processor to:

provide the function model as an input to the data flow engine for use in performing the data flow analysis.

13. The non-transitory computer readable medium of claim 1, wherein the function model is validated prior to the function model being provided to the data flow engine.

14. A method comprising:

acquiring a set of function stubs of a software program;

acquiring source code for a set of functions corresponding to the set of function stubs and library documentation related to the set of functions;

executing a query model that generates a set of queries, wherein the query model bases the set of queries on the source code and the library documentation so that the set of queries is tailored to a context of the software program;

executing a machine learning model that takes the source code, the library documentation, and the set of queries as inputs and generates as an output a set of answers to the set of queries;

constructing a function model of a function of the set of functions, using the set of answers; and executing a data flow analysis of the software program, wherein the data flow analysis uses the function model to trace a flow of test data through the source code, and wherein the function model describes a purpose of the function within the context of the software program in a manner that is understandable by a data flow engine that performs the data flow analysis.

15. A system comprising:

a processor; and a non-transitory computer readable medium comprising stored instructions which, when executed by the processor, cause the processor to:

acquire a first function model of a source code element, wherein the first function model was automatically generated using answers output by a machine learning technique in response to a set of inputs comprising: source code for a set of functions from which the source code element was taken, library documentation related to the set of functions, and a set of queries tailored to a context of the source code element based on the source code and the library documentation;

acquire a second function model of the source code element, wherein the second function model was manually generated by a human;

convert the second function model into a set of labels;

compare the set of labels to another set of labels from which the first function model was generated, to determine a degree of match; and initiate a retraining of a machine learning model used for the machine learning technique when the degree of match is less than a threshold, wherein the retraining utilizes new training data to retrain the machine learning model so that the degree of match at least meets the threshold.

16. The system of claim 15, wherein the first function model represents the source code element in a code form that is readable by a data flow operation.

17. The system of claim 16, wherein the source code element represents at least one of: a source function where data enters a software application, a first sink function where the data is stored by the software application, a second sink function where the data is processed by the software application, a third sink function where the data is transmitted by the software application, or a sanitizing function that renders the data safe for a specific context of the software application.

18. The system of claim 15, wherein each label in the set of labels represents an instance in which the machine learning model determined that the source code element handles data that is designated as sensitive.

19. The system of claim 15, wherein the machine learning model is a generative artificial intelligence model.

20. The system of claim 19, wherein the generative artificial intelligence model is a large language model.

* * * * *